April 18, 1967 R. G. RUDNESS ETAL 3,314,769
ARC PROCESS AND APPARATUS FOR GROWING CRYSTALS
Filed May 8, 1963
2 Sheets-Sheet 1

INVENTORS
ROBERT G. RUDNESS
WILLIAM C. McGILL
BY Richard S. Shrew
ATTORNEY

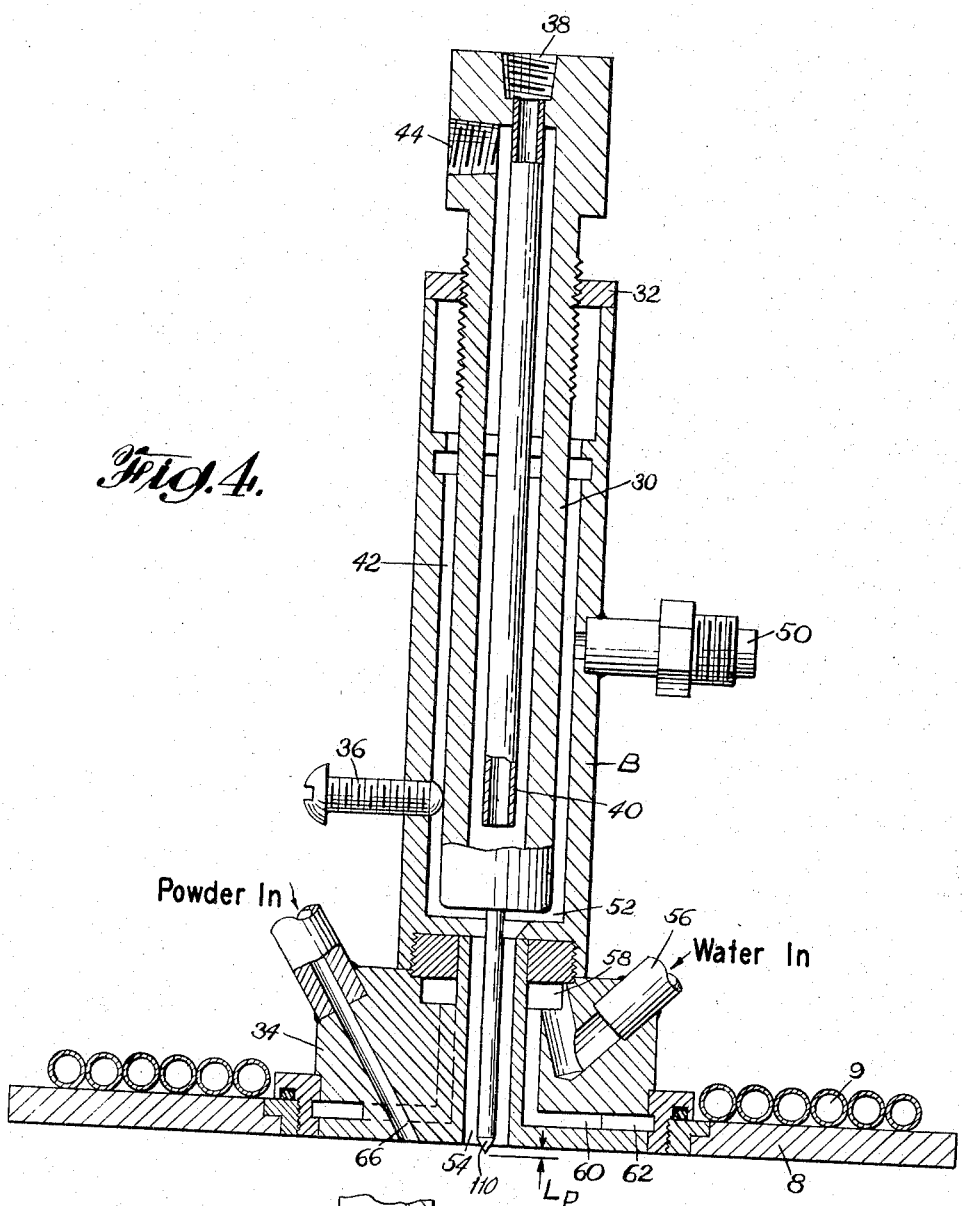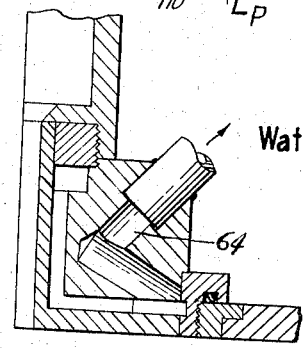

United States Patent Office 3,314,769
Patented Apr. 18, 1967

3,314,769
ARC PROCESS AND APPARATUS FOR
GROWING CRYSTALS
Robert G. Rudness and William C. McGill, Indianapolis, Ind., assignors to Union Carbide Corporation, a corporation of New York
Filed May 8, 1963, Ser. No. 278,956
13 Claims. (Cl. 23—301)

This invention relates to novel monocrystalline boules of refractory metals and metal compounds and to a method and apparatus for making same. More particularly, it relates to such monocrystalline boules having unique properties.

The main object of the present invention is to improve the process and apparatus of said copending application. Particular objects are to provide optimum electrode extrusion, optimum shielding gas flow, and optimum cooling of the torch chamber.

In the drawings:

FIGURE 4 is an enlarged section of a modified top for the torch body in the apparatus shown in FIGURE 3; and FIGURE 5 is a detail section of the water outlet of FIGURE 4.

Figure 1:
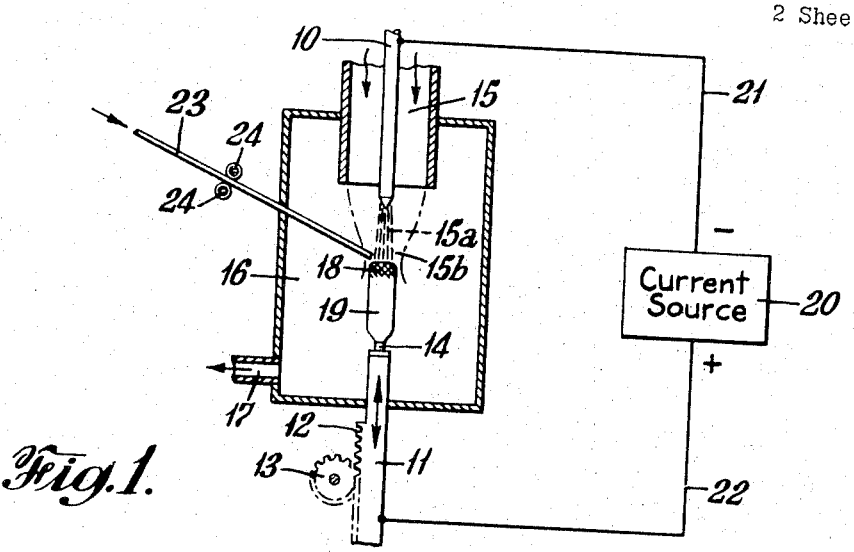
FIGURE 1 is a schematic electrical circuit and view in vertical midsection with parts being in elevation, showing novel apparatus for growing an electrically conductive crystalline boule by the process of the invention, wherein the solid feed constituents are introduced by the boule-growing zone in the form of an elongated solid.

More specifically in accordance with the embodiment of the invention illustrated in FIG. 1, first stick electrode 10 preferably composed of thoriated tungsten or the like, and movable boule support rod 11 are positioned near each other and preferably in coaxial alignment with a space therebetween. Any suitable lowering mechanism for the boule support rod 11 may be provided, such as teeth 12 in mesh-gear relationship with horizontally rotating member 13. If desired, boule support rod 11 may be horizontally rotated for greater assurance of uniform boule growth around the vertical axis (horizontally rotating means not shown). Seed crystal 14 may be placed on top of the boule support rod 11 if a particular crystallographic orientation is required.

First electrode 10 is surrounded by concentrically positioned tube 15 with an annular space therebetween for the introduction and passage of a gas stream which preferably envelopes and protects first electrode 10 from contamination by the molten boule material. The gas stream emerging from tube 15 also envelopes or contains the freely-burning unconstricted arc 15a which has initially been established between first electrode 10 and seed crystal 14, thus shielding the boule-growing zone 15b from atmospheric contamination. It is to be understood that the primary purpose of the gas stream is to maintain the arc, and it is not essential that such stream envelop the first electrode although this is the preferred embodiment. As additional protection against contamination, the entire growth zone may be enclosed within gas-tight chamber 16, the gas stream leaving such chamber through outlet port 17. Chamber 16 also serves to minimize dissipation of heat from the boule-growing zone 15b, helps to maintain the desired temperature gradient across the molten cap 18 of the falling boule-growing material away from the boule support rod 11 by air currents circulating transversely across the boule-growing zone. A sealed chamber also permits operation at pressures above or below atmospheric pressures if these conditions are found desirable.

The first stick electrode 10 is connected to the negative side of a direct current source 20 by lead 21, while the positive side of such source is connected to the electrically conductive boule support rode by lead 22. Although direct current-straight polarity operation (support rod positive) is illustrated, it is to be understood that direct current-reverse polarity operation (first electrode positive) is suitable. Furthermore, alternating current is also practicable. While it is preferable to carrying out this invention using only two electrodes, it is understood that additional electrodes may be included if so desired. The solid feed constituents may, for example, be introduced into the boule-growing zone 15b in the form of an elongated solid such as wire 23 fed by rolls 24.

The aforedescribed novel apparatus may be used to grow crystalline boules according to the process of the present invention as follows: A freely-burning unconstricted electric arc is established between first electrode 10 and seed crystal 14, and the wire feed constituents are fed into the boule-growing zone 15b where they are fused and deposited on such crystal. As previously explained, the necessary heat is provided directly by the electric arc and indirectly by the arc-containing gas stream. As the feed constituents fuse and accumulate on seed crystal 14, progressive crystallization is induced to form a boule 19 having the same crystallographic orientation as the seed crystal by gradually lowering the boule support rod 11 vertically downwardly away from the boule-growing zone 15b to maintain the proper temperature gradient through the molten cap 18 and also to maintain the arc length reasonable constant. During growth the arc is thus mainatined between the arcing tip of electrode 10 and the molten boule cap 18. It is to be understood that the process variables such as heat input and the boule position may be adjusted in a manner well-known to those skilled in the art.

Figure 2:
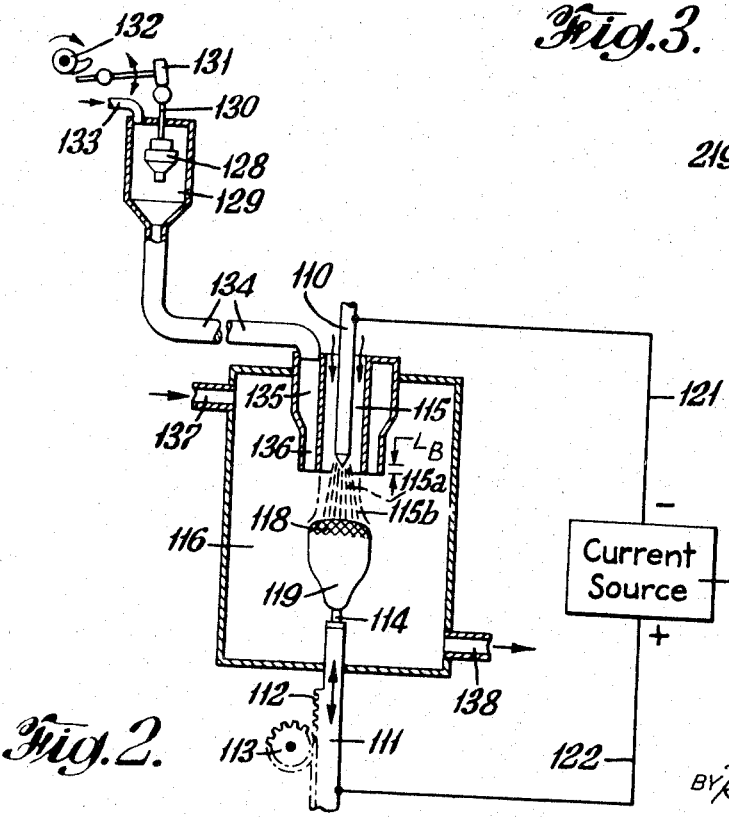
FIGURE 2 is a schematic electrical circuit and view in vertical midsection with parts being in elevation, showing another embodiment of novel apparatus for performing the present process, wherein the solid feed constituents are introduced in the boule-growing zone in the form of powder.

FIG. 2 illustrates apparatus and process embodiments of the present invention which are similar to those illustrated in FIG. 1 but differing in certain respects which will now be described. The solid feed constituents are provided in the form of powder, and may for example be placed in a basket screen 128 within a hopper 129. Powder is periodically sifted out of the screen by intermittently striking an anvil 130 which projects from the top of the screen to the outside of the hopper 129, with a pivoted hammer 131 actuated by a rotating cam 132. A carrier gas stream, for example argon, enters the hopper 129 through conduit 133 and transports the powder through hopper discharge conduit 134 into annular space 135 between the outer walls of first electrode containing tube 115 and concentrically aligned feed constituent tube 136. The discharge end of the tube 136 is necked in for coaxially orienting the emitted powder feed containing carrier gas stream relative to the boule growing zone 115b and the boule-growing surface. The powder feed constituents dropping into such zone are heated, fused, and accumulated on the boule-growing surface as previously described. A third gas stream providing additional protection for the boule-growing zone 115b from atmospheric contamination may be introduced into chamber 116 through opening 137 and discharged through opening 138. Although intermittent introduction of the feed constituents has been described and illustrated, the process and apparatus of the present invention as illustrated in FIG. 2 are adaptable to continuous introduction of the feed constituents. This could be achieved, for example by introducing such feed through conduit 133.

Figure 3:
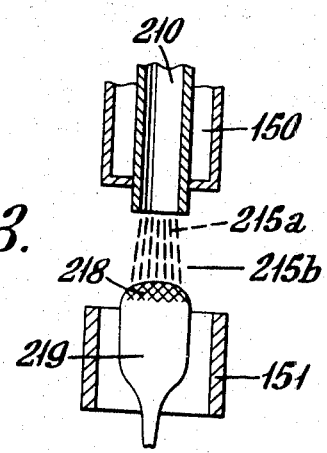
FIGURE 3 is a view in vertical midsection with parts being in elevation, showing still another embodiment of novel boule growing apparatus for performing the present process, in which a hollow first electrode is employed.

FIG. 3 illustrates a first electrode and boule-growing zone assembly in which a hollow electrode is employed. The solid feed constituents either in powder or elongated solid form are introduced in the boule-growing zone 215b through hollow electrode 210, and may be transported by a carrier gas if desired. Such electrode is preferably surrounded by annular cooling passage 150 to protect it from melting. Another novel feature of the FIG. 3 embodiment is the employment of external heating means such as annular heating coils 151 coaxially aligned around the boule-growing zone 215b. Such heating means are particularly suitable when boules are to be grown from feed constituents which are electrically conductive at the growth conditions but relatively non-conductive at substantially lower temperatures. To grow massive boules from these materials it is necessary to maintain the entire boule at a sufficiently high temperature for the desired current to flow through the boule to the electrical contact, and this function may be conveniently performed by heater 151.

FIG. 4 depicts a modified torch which is used in conjunction with the chamber and boule arrangement of FIG. 2, the top portion of the chamber being formed by the flange 8. Flange 8 is cooled through water cooling coils 9.

Electrode 110 is held within torch body B through the electrode holder 30 and the cap 32. Exact axial alignment with the nozzle 34 is maintained through a plurality (3) of set screws 36. The electrode is preferably cooled by passing cooling water through the electrode holder by way of inlet 38, through conduit 40, to annulus 42 and then out outlet 44. Selected arc gas enters through inlet 50 and then passes to the boule surface by way of annulus 52 and nozzle passage 54. Nozzle 34 is preferably cooled by passing cooling water into inlet 56, through annulus 58, through the plurality of conduits 60 to annulus 62 and then through outlet 64. Because of the cooling passages, the powder with its carrier gas is fed to the boule-growing surface by way of the plurality (3) of inlets 66 rather than through the annulus of FIG. 2 in the application. The inlets are preferably positioned symmetrically around the nozzle passage for an even distribution of powder flow.

The position of the electrode with respect to the nozzle has been found to be critical. That is, if the electrode extends too far beyond the nozzle exit powder build-up on the electrode will occur, primarily because of arc pumping. On the other hand, if the electrode is set back too far within the nozzle, spurious or double arcing to the nozzle will occur. Since the nozzle forms a basis for the criticality, the position of the electrode will vary according to the nozzle and electrode diameters or the width of the annulus 54. It has been found that the electrode should not project more than one electrode diameter beyond the nozzle exit, nor should it be set back more than ¼ the electrode diameter when the width of annulus 54 is 1/32 of an inch. (In FIGURE 2, the electrode is shown set back distance $L_B$, meaning the distance the electrode is set back from the nozzle exit; and in FIGURE 4, the electrode is shown set forward in distance $L_P$ meaning the distance the electrode projects forward of the nozzle exit.) In the preferred form the electrode will project ¼ the diameter of the electrode beyond the nozzle exit. When the annulus 54 is 1/64 inch, the projection should be no greater than ¾ the electrode diameter, nor should it be set back more than ⅛ the diameter, with a ⅛ diameter projection being preferred. For a 1/16 inch annulus the projection should be no greater than 1¼ diameters, nor should the setback be more than ½ diameter, with a ½ diameter projection being preferred. For a 3/32 inch annulus, the projection should be no greater than 3/32 inch annulus, the projection should be no greater than 1½ diameters, while the setback should be no greater than ¾ the diameter, with a ¾ diameter projection being preferred. For a ⅛ inch annulus, the projection should be no greater than 1¾ diameters, while the setback should be no greater than 1 diameter, with a 1 diameter projection being preferred.

An inert gas such as argon, helium, and nitrogen is supplied to the system both as a shielding gas and as a carrier gas. Argon and helium are the preferred gases, nitrogen being used principally as an additive to form atomic nitrogen for the growth of nitrides. For growing boules less than 1 inch in diameter, argon is principally used. However, for growing boules of greater diameter, helium is preferred. It has been found that the use of argon for these larger boules causes cavities to be formed in the boule growing surface.

When using argon or helium, the flow conditions have been found to be critical. That is, if an insufficient amount of gas is used as the shielding gas around the electrode, the arc will be unstable, causing irregularities in the crystal growth, while if an excessive amount of gas is used, the momentum of the gas will cause deterioration in the boule-growth surface. If an insufficient amount of gas is used as the powder carrier, the powder will "dribble" into the boule-growing area, rather than being directed onto the boule-growing surface. On the other hand, if the flow becomes excessive when used as the carrier gas, the powder flow will, in effect, amount to a sandblasting operation. In either case, whether being used as shielding gas, or the carrier gas, the preferred amount of gas will depend upon whether argon or helium is being used. Generally speaking, however, when being used as a shielding gas, the mass flow rate of the gas should be between 9 and 150 lbs./hr./sq. in. of passage area, and for the carrier gas the amount should be between 10 and 230 lb./hr./sq. in. of passage area.

When using argon as the shielding gas the mass flow rate should be between 20 and 150 lb./hr./sq. in. of passage area with 50–65 lb./hr./sq. in. being preferred. When used as the carrier gas the range should be between 30 and 230 lb./hr./sq. in. with the preferred range being between 75 and 110 lb./hr./sq. in.

When using helium as the shielding gas, it has been found that 100% helium cannot be used. That is, with pure helium electrode erosion will occur. Expressed in cubic feet per hour, the ratio of the helium to the argon should be about 3 to 1. Under this condition the mass flow rate of the helium should be between 9 and 45 lb./hr./sq. in., while the argon rate should be between 20 and 135, the preferred rate being about 20 lb./hr./sq. in. for the helium and about 50 lb./hr./sq. in. for the argon. When helium is used as the powder carrier gas, it alone is used at a mass flow rate of between 10 and 70 lb./hr./sq. in. with a rate of about 30 lb./hr./sq. in. being preferred.

What is claimed is:
1. A process for growing an electrically conductive crystalline boule from solid feed constituents which comprises establishing a freely burning unconstricted electric arc between a first electrode and a second electrode provided with a boule-growing surface; passing a gas stream through a nozzle surrounding said first electrode and hav- ing an exit annulus through which said gas stream passes in intimate contact with said first electrode to contain the free arc and protect such first electrode from contamination by molten boule material; maintaining any projection of the electrode beyond said exit annulus insufficient to cause power build up on the electrode but any set back of said electrode insufficient to cause double arcing and within the ranges set forth in the table below:

| Annulus Width In Inches | Maximum Projection of Electrode $L_P$, in Electrode Diameters | Maximum Set Back of Electrode $L_B$, in Electrode Diameters |
|---|---|---|
| 1/64 | 3/4 | 1/8 |
| 1/36 | 1 | 1/4 |
| 1/16 | 1 1/4 | 1/2 |
| 3/32 | 1 1/2 | 3/4 |
| 1/8 | 1 3/4 | 1 | passing the resulting free arc-containing gas stream to a boule-growing zone and thereby heating said boule-growing surface positioned within such zone which is shielded from atmospheric contamination by such gas; introducing solid feed constituents in said boule-growing zone; fusing such solid feed constituents on said boule-growing surface by heat from said free electric arc and the gas stream; and accumulating such fused constituents thereon as a crystalline boule of increasing size.

2. Process as claimed in claim 1 in which the flow of shielding gas is between 9 and 150 lbs. per hour per square inch of the area of said exit annulus.

3. Process as claimed in claim 1 in which the gas of said stream for growing boules less than one inch diameter is argon.

4. Process as claimed in claim 3 in which the argon flow rate is between 20 and 150 lbs. per hour per square inch of area of said exit annulus.

5. Process as claimed in claim 4 in which said argon flow rate is between 50 and 65 lbs. per hour per square inch of area of said exit annulus.

6. Process as claimed in claim 1 in which the gas of said stream for growing boules greater than one inch in diameter is a mixture of argon and helium.

7. Process as claimed in claim 6 in which the gas stream contains about three volumes of argon to one volume of helium.

8. Process as claimed in claim 7 in which the helium flow is between 9 and 45 lbs. per hour per square inch and the argon flow is between 20 and 135 lbs. per hour per square inch.

9. Process as claimed in claim 7 in which the helium flow is about 20 lbs. per hour per square inch and the argon flow is about 50 lbs. per hour per square inch.

10. Process as claimed in claim 1 in which said solid feed constituents are introduced by a carrier gas in a flow sufficient to prevent dribbling into the boule-growing area, but insufficient to effect any sand blasting operation and within the range of between 10 and 230 lbs. per hour per square inch of cross sectional area of the carrier gas stream.

11. Process as claimed in claim 10 in which the carrier gas is argon with a flow rate of between 75 and 110 lbs. per hour per square inch.

12. Process as claimed in claim 10 in which the carrier gas is helium with a flow rate of between 10 and 70 lbs. per hour per square inch.

13. Apparatus for growing an electrically conductive crystalline boule from solid constituents including a torch body having a chamber thereon and a top thereabove, a first electrode holder mounted in said top and having a cooling jacket, a first electrode mounted in said cooled holder, a cooling coil above said top for cooling said chamber, a second electrode mounted in the bottom of said torch body comprising a boule support rod positioned near said first electrode and having a boule-growing surface on the top thereof; means for establishing a freely burning unconstricted arc between said first and second electrodes; means for passing gas through said electrode holder to the space between said electrodes in sufficient amount to maintain said arc; said chamber enclosing said free arc and said boule-growing surface for establishing an enclosing gas atmosphere; and passage means through said top outside of said electrode holder and inside of said cooling coil for introducing said solid feed constituents to said boule-growing surface to fuse and accumulate such constituents as a crystalline boule of increasing size.

References Cited by the Examiner

UNITED STATES PATENTS

| 1,529,943 | 3/1925 | Rouvre | 23—273 X |
| 2,965,456 | 12/1960 | Clark | 23—273 |
| 2,970,895 | 2/1961 | Clark | 23—273 |
| 3,234,051 | 2/1966 | Kiffer | 23—273 |

FOREIGN PATENTS 774,270  5/1957  Great Britain.

NORMAN YUDKOFF, *Primary Examiner.*

G. HINES, *Assistant Examiner.*